United States Patent
Yada et al.

(10) Patent No.: US 7,908,361 B2
(45) Date of Patent: Mar. 15, 2011

(54) COMPUTER MAINTENANCE SUPPORT SYSTEM AND ANALYSIS SERVER

(75) Inventors: Junichi Yada, Saitama (JP); Tomota Hitokoto, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 299 days.

(21) Appl. No.: 11/892,083

(22) Filed: Aug. 20, 2007

(65) Prior Publication Data

US 2008/0082587 A1   Apr. 3, 2008

(30) Foreign Application Priority Data

Sep. 29, 2006   (JP) .................. 2006-269069

(51) Int. Cl.
*G06F 16/30* (2006.01)
(52) U.S. Cl. ........................ 709/224; 707/200
(58) Field of Classification Search .................. 709/224, 709/203.204
See application file for complete search history.

(56) References Cited

U.S. PATENT DOCUMENTS

| | | | | |
|---|---|---|---|---|
| 5,829,983 A * | 11/1998 | Koyama et al. | ............... | 434/118 |
| 6,021,437 A * | 2/2000 | Chen et al. | .................... | 709/224 |
| 2002/0007255 A1 * | 1/2002 | Fujita et al. | .................... | 702/188 |
| 2002/0049563 A1 * | 4/2002 | Vetter et al. | .................... | 702/184 |
| 2003/0225768 A1 * | 12/2003 | Chaudhuri et al. | ............. | 707/10 |
| 2006/0155866 A1 * | 7/2006 | Wei | ............................... | 709/231 |
| 2007/0179658 A1 * | 8/2007 | Hamada | ......................... | 700/121 |

FOREIGN PATENT DOCUMENTS

JP       2005266919       9/2005

* cited by examiner

*Primary Examiner* — Wing F Chan
*Assistant Examiner* — Tesfay Yohannes
(74) *Attorney, Agent, or Firm* — Rabin & Berdo, P.C.

(57) ABSTRACT

The present invention provides a computer maintenance support system which, in addition to simple analysis results, provides more detailed analysis results. The system provides information for supporting computer maintenance operations, and includes an analysis device, an analysis server and an output device for monitoring. The analysis device collects and analyzes analysis object data which has been saved at a maintenance object computer. The analysis object data includes settings information of the computer and log information which has recorded operations of the computer. The analysis server is connected with one or more analysis devices, acquires the analysis object data from an analysis device, and analyzes the analysis object data. The output device for monitoring receives a primary analysis report, from analysis by the analysis device, and a secondary analysis report, from analysis by the analysis server, and outputs information to be used for the computer maintenance operations.

15 Claims, 6 Drawing Sheets

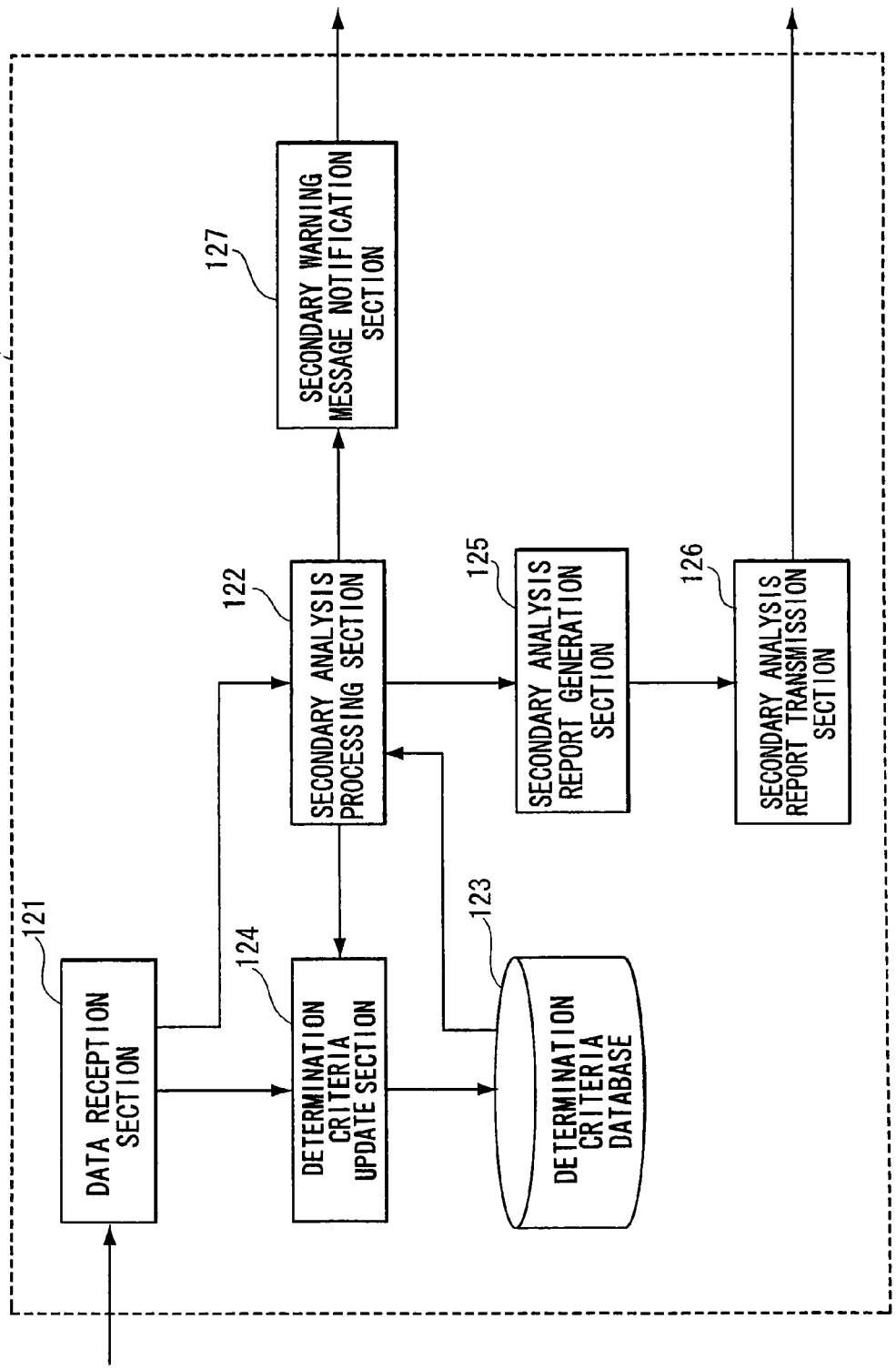

FIG. 4

| ANALYSIS OBJECT DATA | DATA CONTENTS |
|---|---|
| SYSTEM STRUCTURE INFORMATION | HOST NAME (uname), MODEL NAME (model), HARDWARE STRUCTURE (ioscan), RUNNING TIME (uptime), ETC. |
| APPLICATION INFORMATION | INSTALLED PRODUCTS (swlist, ETC.), PATCH INFORMATION (swlist, ETC.), ETC. |
| KERNEL INFORMATION | KER NELPARAMETERS (system file), 32/64 BIT MODE (getcnf), ETC. |
| MEMORY INFORMATION | SWAP REGION (swapinfo), VIRTUAL MEMORY (vmstat), INSTALLED MEMORY (dmesg, ETC.), ETC. |
| VARIOUS SETTINGS FILES | STARTUP SCRIPTS (/etc/rc.config.d/*), ETC. |
| VARIOUS LOG INFORMATION | INSTALLATION LOG (swinstall.log, ETC.), OS LAUNCH LOG (rc.log), SYSTEM LOG (syslog), ETC. |
| CLUSTER INFORMATION | cmviewcl, cmscancl, ETC. |
| NETWORK SETTINGS INFORMATION | NETWORK INTERFACE SETTINGS (ifconfig), NETWORK STATUS (netstat), ETC. |
| DISC-RELATED INFORMATION | DISC USAGE VOLUME (bdf), LVM STRUCTURE FILE (lvmtab), MIRROR STRUCTURE (lvdisplay), ETC. |

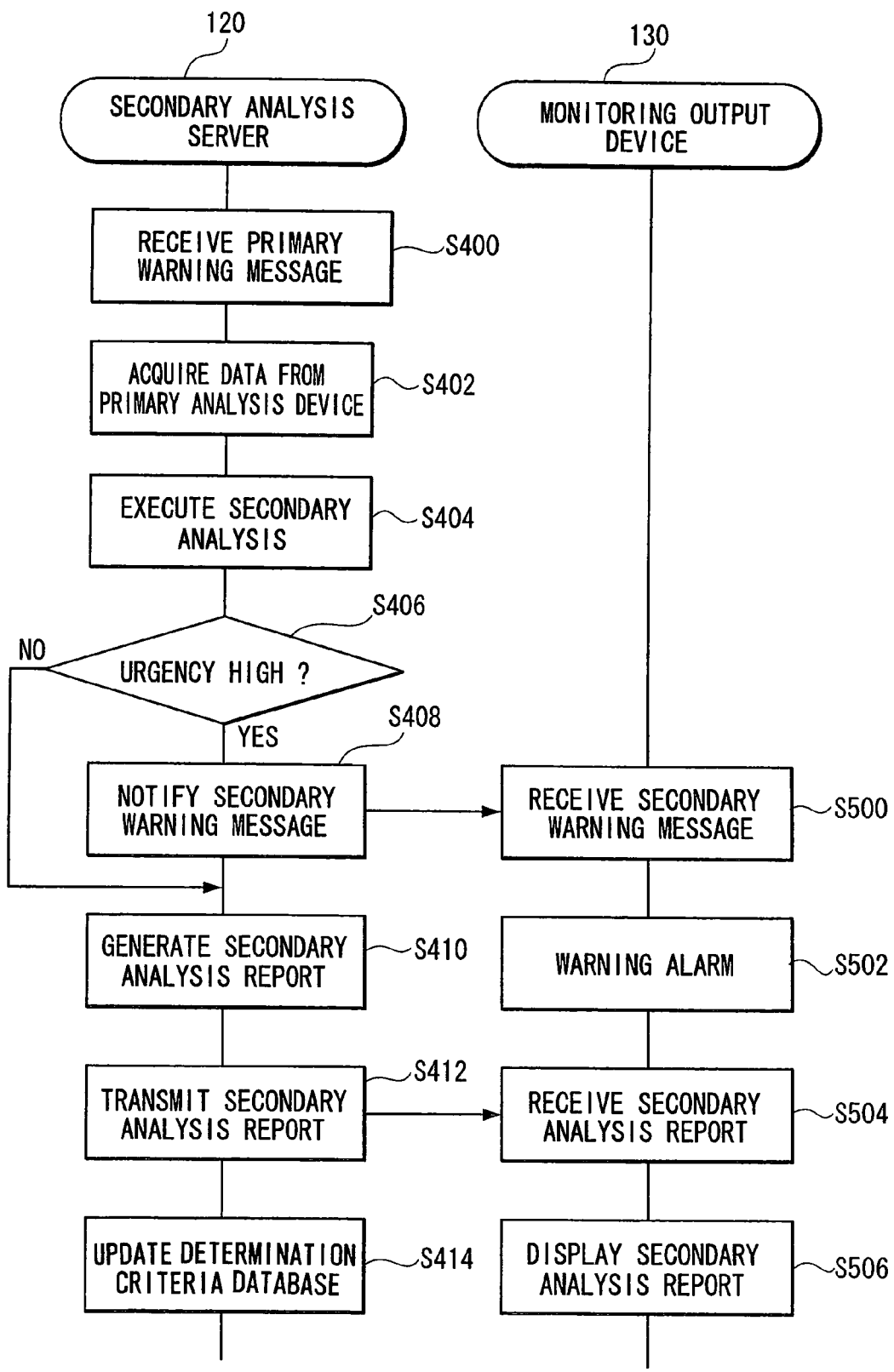

COMPUTER MAINTENANCE SUPPORT SYSTEM AND ANALYSIS SERVER

CROSS-REFERENCE TO RELATED APPLICATION

This application claims priority under 35 USC 119 from Japanese Patent Application No. 2006-269069, the disclosure of which is incorporated by reference herein.

BACKGROUND OF THE INVENTION

1. Field of the Invention

The present invention relates to a computer maintenance support system and an analysis server, and more particularly to a computer maintenance support system and analysis server for supporting computer maintenance operations.

2. Description of the Related Art

An administrator of a computer system such as a server computer or the like, when performing system maintenance tasks such as checking settings of the system, scanning at times of malfunction and the like, often uses system structure information, log files and the like which have been saved in the computer system.

System structure information is information on settings which constitute an operating system (OS) which administers the computer system. The system structure information includes, for example, a computer name which is required for installation of the OS, network setting values such as an IP (Internet Protocol) address, a subnet mask, a default gateway and the like, kernel definition information (configuration) values, and so forth. These setting values are initialized at a time of OS installation, are automatically updated at times of addition of hardware, applications and the like, and are manually updated by system administrator operations.

Log files are files in which system operation conditions are recorded, which are outputted by the OS, the applications and the like. Log files recorded by the OS may be, for example, an event log which records situations in which program launches, hardware problems and the like occur, a performance log which records usage conditions of a CPU, memory and the like, and so forth.

By referring to this system state information, log files and the like, a system administrator can check settings of the computer system and can check whether or not the system is running correctly. Further, by analyzing such information when a malfunction occurs, a cause of the malfunction can be ascertained and settings changed, and thus the system can be returned to a proper state.

Heretofore, methods for automatically collecting system structure information, log files and the like as described above and employing the same for system maintenance tasks have been proposed. For example, Japanese Patent Application Laid-Open (JP-A) No. 2005-266919 has described a system analysis device which automatically collects system structure information, log files and the like, and analyzes this information on the basis of pre-specified determination criteria.

However, with previous methods, there have been problems in that, even with settings information, log information and the like being automatically collected, it takes time for an operator responsible for maintenance and analysis to perform the analysis, and in that failures to notice check items, mistakes in checking, failures to notice problems and the like tend to occur, and so forth. Furthermore, because skill is required for analyzing the contents of a log, there has been a problem in that determination criteria in analyses may differ with different operators, and quality of the analyses is inconsistent.

Moreover, even when automatic analysis of the collected data is performed, setting and updating of analysis conditions is troublesome, and automatic analysis alone may be insufficient, with more detailed analysis having to be performed by an operator responsible for further analysis.

SUMMARY OF THE INVENTION

Accordingly, the present invention has been devised in consideration of the problems described above. The present invention is to provide a new and improved computer maintenance support system which, in addition to simple analysis results, is capable of providing more detailed analysis results and supporting computer maintenance administration tasks.

A first aspect of the present invention is a computer maintenance support system that provides information for supporting computer maintenance operations, the system including: an analysis device that collects and analyzes analysis object data which has been saved at a computer which is an object of maintenance, the analysis object data including settings information of the computer and log information of recorded operations of the computer; an analysis server connected with at least one of the analysis devices, the analysis server acquiring the analysis object data from the analysis device and analyzing the analysis object data; and an output device for monitoring that receives a primary analysis report of analysis by the analysis device, and a secondary analysis report of analysis by the analysis server, and outputs information to be used for the computer maintenance operations.

According to the described structure, the analysis object data is acquired automatically, and a primary analysis can be performed at that time. Therefore, failures to collect the analysis object data can be prevented. Furthermore, the analysis object data collected by the analysis device is further analyzed by the analysis server. Thus, a simple analysis is performed at the analysis device and problems can be detected, and stepwise analysis processing for performing more detailed analysis can be performed at the analysis server.

In the above-described aspect, the analysis server may include a determination criteria database to be used in analysis of the analysis object data, the determination criteria database memorizing determination criteria for determining whether or not there is a problem at the computer, and the determination criteria database being updated on the basis of results of analysis processing at the analysis server. Thus, know-how obtained in the analysis processing can be used as determination criteria, and higher quality analyses can be performed. Furthermore, by using a determination information database which reflects such analysis processing know-how, even a user without specialist knowledge can perform reliable maintenance work with ease.

In the above-described aspect, the analysis server may be connected with a plurality of the analysis devices and, when analyzing the analysis object data acquired from one of the plurality of analysis devices, may perform analysis by comparing the analysis object data with at least one of analysis object data acquired from another of the analysis devices and previous analysis object data of the one analysis device. Thus, compared with analysis processing at an analysis device that uses only analysis object data collected from a computer that is an object of performance of analysis, a more advanced analysis of the details can be performed.

In the above-described aspect, the analysis server may receive the primary analysis report from the analysis device and use the primary analysis report in analysis of the analysis object data. Thus, more detailed analysis can be performed on the basis of results of the analysis performed in the primary analysis processing. Therefore, analysis processing can be performed efficiently.

In the above-described aspect, the analysis server may use at least one of the analysis object data and the primary analysis report received from the analysis device to update the determination criteria database. Thus, know-how obtained through the analysis processing performed by the analysis device can be reflected in the determination criteria database.

In the above-described aspect, the analysis device may send a primary warning message, which gives notice of the urgency of a problem detected by analysis processing, to at least one of the analysis server and the output device for monitoring. Thus, the occurrence of a problem and seriousness and urgency of the problem can be notified to a user promptly, and the user can take rapid action in response to the problem.

In the above-described aspect, the analysis server may, rather than performing analysis processing before the primary warning message is issued from the analysis device, acquire the analysis object data from the analysis device and perform analysis processing only after the primary warning message has been issued. Thus, it is possible for detailed analysis to be performed by the analysis server only when a problem has been detected by the analysis device, and the analysis server can be efficiently used only when analysis is required.

In the above-described aspect, the output device for monitoring may output a warning alarm, to give notice of an anomaly to a user, when the output device for monitoring receives the primary warning message. Thus, an analysis operator, a user or the like can be promptly made aware of an anomaly at the computer, and a rapid response is enabled.

In the above-described aspect, the analysis server may send a secondary warning message, which gives notice of the urgency of a problem detected by analysis, to the output device for monitoring, and when the output device for monitoring receives the primary warning message and the secondary warning message, the output device for monitoring may output a warning alarm. Thus, when seriousness or urgency of a problem is high, notification with the warning alarm can be implemented.

In the above-described aspect, the output device for monitoring may output the primary analysis report and the secondary analysis report in association with one another. Thus, when details which have been analyzed at the analysis device are further analyzed in more detail by the analysis server, results of detailed analysis of problems that were detected in the primary analysis report can be observed in the secondary analysis report with ease. Furthermore, there may be a large amount of data in the secondary analysis report, because the secondary analysis report includes detailed analysis results. However, in such a case, contents that should be observed can be found with ease.

A second aspect of the present invention is an analysis server that provides information for supporting computer maintenance operations, the analysis server including: an analysis object data acquisition section that acquires analysis object data which has been collected by at least one analysis device, the analysis object data, which has been saved at a computer which is an object of maintenance, including settings information of the computer and log information recording operations of the computer; an analysis processing section that analyzes the analysis object data; and a report generation section that generates an analysis report from results of analysis by the analysis processing section.

According to the described structure, analyses can be collectively performed using analysis object data from a number of computers. Furthermore, in addition to results of simple analyses performed for each computer, higher quality analysis results can be provided in further detail.

In the above-described aspect, the analysis server may further include a determination criteria database that memorizes, from analyzed contents of the analysis object data, determination criteria for determining whether or not there is a problem at the computer, the determination criteria database being updated on the basis of results of analysis processing at the analysis server. Thus, know-how obtained in the analysis processing can be used as determination criteria, and higher quality analyses can be performed. Furthermore, by using a determination information database which reflects such analysis processing know-how, even a user without specialist knowledge can perform reliable maintenance work with ease.

In the above-described aspect, the analysis server may be connected with a plurality of the analysis device and, when the analysis processing section analyzes the analysis object data acquired from one of the plurality of analysis devices, the analysis processing section may perform analysis by comparing the analysis object data with at least one of analysis object data acquired from another of the analysis devices and previous analysis object data of the one analysis device. Thus, compared with analysis processing at an analysis device that uses only analysis object data collected from a computer which is an object of performance of analysis, a more advanced analysis of the details can be performed.

In the above-described aspect, the analysis processing section may receive a primary analysis report, of analysis by the analysis device, from the analysis device and use the primary analysis report in analysis of the analysis object data. Thus, more detailed analysis can be performed on the basis of results of the analysis performed by the primary analysis processing. Therefore, analysis processing can be performed efficiently.

In the above-described aspect, the determination criteria database may be updated using at least one of the analysis object data and the primary analysis report received from the analysis device. Thus, know-how obtained through the analysis processing performed by the analysis device can be reflected in the determination criteria database.

In the above-described aspect, the analysis server may, rather than performing analysis processing before being notified with a primary warning message, which gives notice of the urgency of a problem detected by analysis processing, acquire the analysis object data from the analysis device and perform analysis processing only after the primary warning message has been issued. Thus, it is possible for detailed analysis to be performed by the analysis server only when a problem has been detected by the analysis device, and the analysis server can be efficiently used only when analysis is required.

In the above-described aspect, the analysis server may send a secondary warning message, which gives notice of the urgency of a problem detected by the analysis processing section, to an external device. Thus, the occurrence of a problem and seriousness and urgency of the problem can be notified to a user promptly, and the user can take rapid action in response to the problem.

As described above, the present invention provides more detailed analysis results in addition to simple analysis results, and supports computer maintenance administration tasks.

BRIEF DESCRIPTION OF THE DRAWINGS

An exemplary embodiment of the present invention will be described in detail based on the following figures, wherein:

FIG. 3 is a block diagram showing schematic structure of a secondary analysis server relating to the present embodiment;

FIG. 4 is an explanatory view showing an example of analysis object data collected at an analysis object data collection section relating to the present embodiment;

FIG. 6 is a flowchart showing a flow of processing of the secondary analysis server and the output device for monitoring.

DETAILED DESCRIPTION OF THE INVENTION

Figure 1:
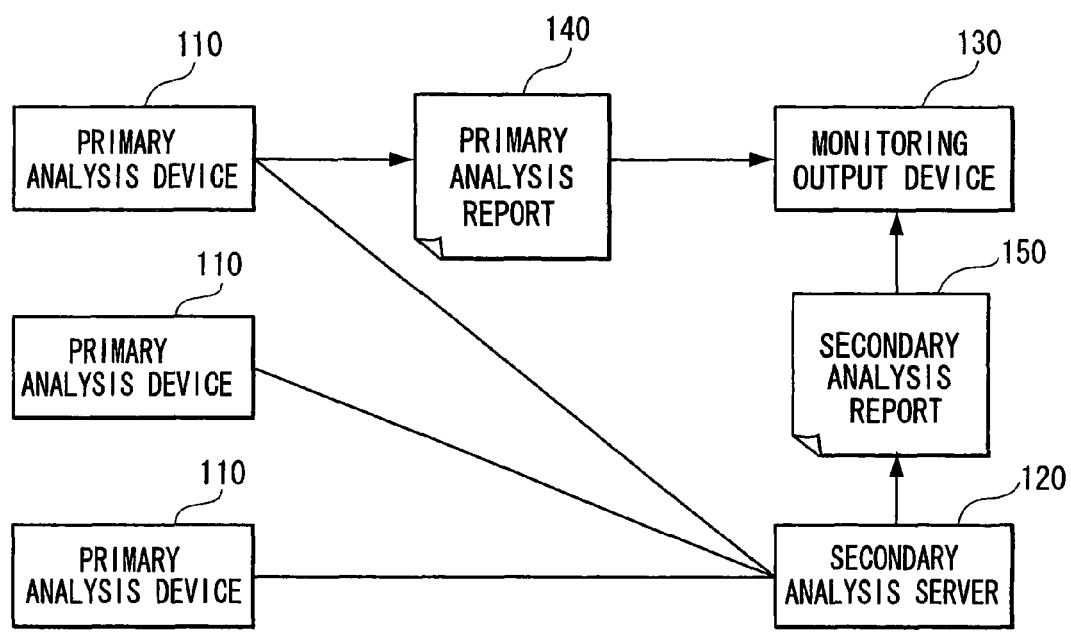
FIG. 1 is a block diagram showing schematic structure of a computer maintenance support system relating to a present embodiment.

Herebelow, the present embodiment will be described in detail with reference to the attached drawings. In this specification and the drawings, structural elements that have substantially matching functional structures are assigned the same reference numerals and, accordingly, duplicate descriptions will not be given.

Figure 2:
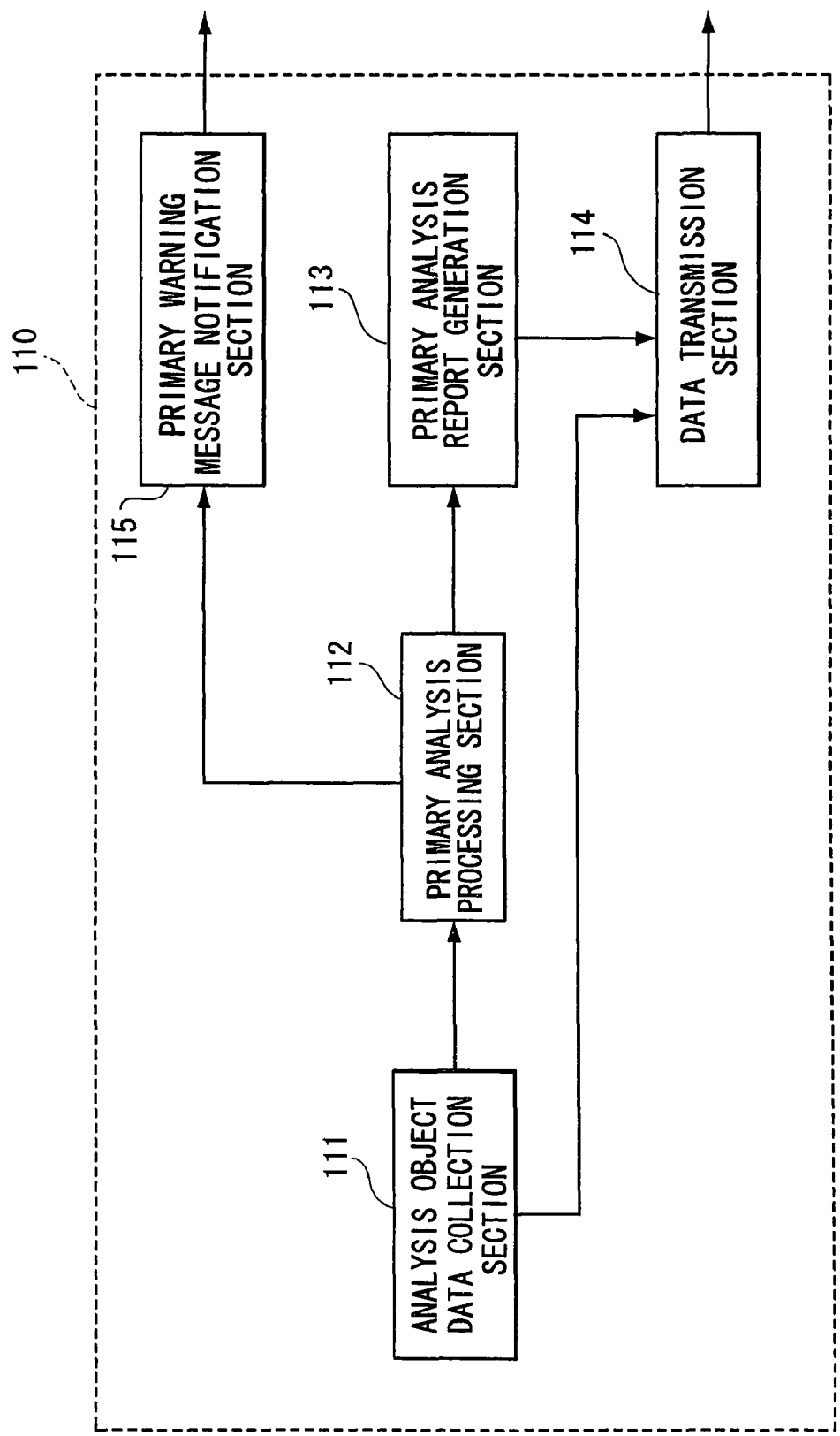
FIG. 2 is a block diagram showing schematic structure of a primary analysis device relating to the present embodiment.

Firstly, with reference to FIG. 1 to FIG. 3, a computer maintenance support system relating to the present embodiment will be described. FIG. 1 is a block diagram showing schematic structure of a computer maintenance support system 100 relating to the present embodiment. FIG. 2 is a block diagram showing schematic structure of a primary analysis device 110 relating to the present embodiment. FIG. 3 is a block diagram showing schematic structure of a secondary analysis server 120 relating to the present embodiment.

The computer maintenance support system 100 relating to the present embodiment is a system for analyzing system structure information, log information and the like of a user's computer, which is an object of maintenance, and for providing information which can be used in maintenance tasks to a system administrator or the like. Here, computer maintenance tasks means operations for setting up a new computer system, altering structures and settings, periodic diagnostics, scanning and recovery at times of malfunctions, and so forth.

As shown in FIG. 1, the computer maintenance support system 100 relating to the present embodiment is structured with the primary analysis devices 110, the secondary analysis server 120 and a monitoring output device 130. Below, each of the structural elements of the computer maintenance support system 100 will be described.

[Primary Analysis Device 110]

The primary analysis device 110 is an apparatus for analyzing the system structure information, log information and the like of the user computer that is the maintenance object (below referred to as the maintenance object computer), and outputting a primary analysis report 140, which is results of analysis, to the monitoring output device 130. As shown in FIG. 2, the primary analysis device 110 is structured with an analysis object data collection section 111, a primary analysis processing section 112, a primary analysis report generation section 113, a data transmission section 114 and a primary warning message notification section 115. Below, each of the sections of the primary analysis device 110 will be described.

[Analysis Object Data Collection Section 111]

The analysis object data collection section 111 is a functional section for collecting data such as settings information, resource information, log information and the like which has been saved at the maintenance object computer (below referred to as analysis object data). The analysis object data collection section 111 performs collection of suitable analysis object data periodically, at a predetermined time interval, or in accordance with operations by an analysis operator or the like. The collected data is sent to the primary analysis processing section 112.

FIG. 4 is an explanatory view showing an example of analysis object data which is collected at the analysis object data collection section 111. As shown in FIG. 4, the collected analysis object data includes information of various logs and the like, such as, for example, system structure information such as a host name, model name and the like of the computer, information on installed applications, kernel information, information relating to memory, networks and discs, log files of an operating system (OS) (syslog.log, shutdownlog, etc.), installation logs and so forth.

The analysis object data collection section 111, rather than acquiring previous information such as a system log and the like of the maintenance object computer at the time of collection, may temporarily acquire system logs and the like when there are changes in settings of the computer, so as to be able to more accurately analyze conditions of the system. Further, the analysis object data to be collected may be added to and altered periodically or as required in accordance with the accumulation of analysis know-how or the like. Further, the analysis object data to be collected may be made selectable in accordance with requirements.

Furthermore, the analysis object data collection section 111 may batch process plural data acquisition processes with a shell script, which is a simple program, and acquire results thereof to serve as the analysis object data. A shell script can be directly interpreted and processed by the shell of an OS. Therefore, consumption of resources and the like at the maintenance object computer can be kept to a minimum, and plural analysis object data sets can be acquired in a short time. Alternatively, the analysis object data collection section 111 may acquire the analysis object data by interactive processing with an analysis/maintenance operator, a user or the like.

[Primary Analysis Processing Section 112]

The primary analysis processing section 112 is a functional section for analyzing details of the analysis object data collected at the analysis object data collection section 111 and identifying problems of the maintenance object computer. The primary analysis processing section 112 receives the analysis object data from the analysis object data collection section 111, analyzes details of the data in accordance with pre-specified determination criteria, and outputs analysis results to the primary analysis report generation section 113. The analysis processing may be executed whenever analysis object data is received from the analysis object data collection section 111. Alternatively, the analysis processing may be executed periodically at a predetermined time interval, with the analysis object data being temporarily stored at a memorization device such as a hard disk or the like (not shown). Alternatively, the analysis processing may be suitably executed in accordance with requests from outside or the like.

The primary analysis processing section 112 analyzes resource usage conditions, setting conditions, operation conditions and the like of the maintenance object computer from details of the analysis object data as shown in FIG. 4. Thus, the primary analysis processing section 112 performs determination of whether or not there is an anomaly at the maintenance object computer, whether there are any errors in specified values, and so forth.

For example, the primary analysis processing section 112 analyzes resource usage conditions from the resource information included in the analysis object data, and if a rate of use of memory is above a predetermined proportion, determines that a shortage of a resource has arisen. Hence, the primary analysis processing section 112 notifies the primary analysis report generation section 113 that the resource shortage has occurred. Further, for example, the primary analysis processing section 112 finds a rate of use of a CPU from log information, and if this usage rate exceeds a predetermined value, for example, 90% or more, determines that the system is running out of control. Hence, the primary analysis processing section 112 notifies the primary analysis report generation section 113 that the system is running out of control.

[Primary Analysis Report Generation Section 113]

The primary analysis report generation section 113 is a functional section for preparing the primary analysis report 140 from the analysis results of the primary analysis processing section 112. The primary analysis report generation section 113 receives analysis results from the primary analysis processing section 112 and generates the primary analysis report 140, which includes problems with settings at the maintenance object computer, methods for responding thereto and the like. The primary analysis report 140 that has been generated is sent to the data transmission section 114. Further, the primary analysis report 140 may be stored at a memorization device such as a hard disk or the like (not shown).

The primary analysis report 140 may be generated in a format which can be displayed by a web browser, such as HTML (HyperText Markup Language), XML (eXtensible Markup Language) or the like. Hence, an analysis operator, a user or the like can check the contents of the primary analysis report 140 using an information processing device at which a web browser is installed.

[Data Transmission Section 114]

The data transmission section 114 is a functional section for transmitting the analysis object data collected by the analysis object data collection section 111 to the secondary analysis server 120. Moreover, the data transmission section 114 is a functional section for transmitting the primary analysis report 140 outputted from the primary analysis report generation section 113 to the monitoring output device 130 and/or the secondary analysis server 120.

The data transmission section 114 may transmit the analysis object data/the primary analysis report 140 to the monitoring output device 130/the secondary analysis server 120 whenever the data transmission section 114 receives the analysis object data/the primary analysis report 140 from the analysis object data collection section 111/the primary analysis report generation section 113. Alternatively, the analysis object data and/or the primary analysis report 140 may be stored at a memorization device such as a hard disk or the like (not shown) and the data transmission section 114 may transmit the analysis object data and/or the primary analysis report 140 periodically at a predetermined time interval. Alternatively, the data transmission section 114 may read out the analysis object data and/or the primary analysis report 140 stored in the memorization device such as a hard disk or the like (not shown) and transmit the same at a time when there is a request from the secondary analysis server 120, the monitoring output device 130 or the like.

[Primary Warning Message Notification Section 115]

The primary warning message notification section 115 is a functional section for notifying the monitoring output device 130 with warning messages concerning problems detected in results of analyses by the primary analysis processing section 112. The warning messages may give notice of all detected problems. Alternatively, levels of seriousness and urgency of detected problems may be compared, and a warning message given only when a problem is detected for which the degree of seriousness or urgency is at least a certain level. Further, warning messages which differ in accordance with levels of seriousness/urgency of problems may be given. Thus, a user can be promptly notified of the occurrence of a problem and of the seriousness and urgency of the problem, and there is a great effect in cases in which it is necessary to respond rapidly to the problem.

Along with the monitoring output device 130, the primary warning message notification section 115 may also notify the secondary analysis server 120 with similar warning messages.

Hereabove, the sections of the primary analysis device 110 have been described. With the described structure, analysis object data is automatically acquired and primary analysis can be performed at this time. Thus, failures to collect analysis object data can be prevented. Moreover, because of the primary analysis report 140 being transmitted, an analysis operator, user or the like can continuously check conditions of the computer, and anomalies can be promptly discovered.

[Secondary Analysis Server 120]

The secondary analysis server 120 is an apparatus for acquiring the analysis object data, the primary analysis report 140 and the like from the primary analysis device 110 and performing a more detailed analysis than the primary analysis device. As shown in FIG. 3, the secondary analysis server 120 is structured with a data reception section 121, a secondary analysis processing section 122, a determination criteria database 123, a determination criteria update section 124, a secondary analysis report generation section 125, a secondary analysis report transmission section 126 and a secondary warning message notification section 127. Below, each of the sections of the secondary analysis server 120 will be described.

[Data Reception Section 121]

The data reception section 121 is a functional section for receiving the analysis object data and/or the primary analysis report 140 outputted from the primary analysis device 110. The data reception section 121 passes on the received analysis object data and/or primary analysis report 140 to the secondary analysis processing section 122. Alternatively, the received analysis object data and/or primary analysis report 140 may be stored in a memorization device such as a hard disk or the like and read out by the secondary analysis processing section 122 at an arbitrary time. The data reception section 121 also receives primary warning messages which are sent from the primary analysis device 110 and notifies the secondary analysis processing section 122 with the received messages.

[Secondary Analysis Processing Section 122]

The secondary analysis processing section 122 is a functional section for performing analysis of the analysis object data received from the primary analysis device 110 by the data reception section 121. When the secondary analysis processing section 122 acquires analysis object data, the secondary analysis processing section 122 uses pre-specified determination criteria in the determination criteria database 123 to perform determination of whether the analysis object data comply with the determination criteria stored in the determination criteria database 123, whether the analysis object data are outside the determination criteria, and the like. As a result, problems with settings, operations and the like of the maintenance object computer are detected. Knowhow obtained from analysis results performed for the plural primary analysis devices 110 is reflected in the determination criteria database 123, and more detailed analyses with higher quality than the primary analysis processing performed by the primary analysis devices 110 can be performed.

Furthermore, the secondary analysis processing section 122 may perform analysis using the contents of the primary analysis report 140 received from the primary analysis device 110 by the data reception section 121. Thus, a more detailed analysis can be performed on the basis of results of the analysis performed in the primary analysis processing. Therefore, analysis processing can be carried out efficiently.

Moreover, the secondary analysis server 120 acquires analysis object data from the plural primary analysis devices 110 and performs analysis processing for the maintenance object computers corresponding to the respective analysis object data sets. Therefore, the secondary analysis processing section 122 may be structured such that, when analysis is being performed for one maintenance object computer, the analysis object data for that computer is compared with analysis object data for another maintenance object computer with a similar system structure and the like, and problems at the maintenance object computer are detected by analyzing differences in settings information and the like. Accordingly, in comparison with analysis processing of the primary analysis device 110 which uses only the analysis object data collected from the computer that is the object of the analysis, analysis of more advanced details can be performed. Further, analysis may be performed by comparing analysis object data from the same analysis device at plural points in time, so that analysis object data at times of proper operation and at times of malfunction occurrence, and before and after changes in various settings, are compared. Accordingly, problems of the maintenance object computer can be detected by analyzing differences in settings information from previous times of proper operation.

Furthermore, the secondary analysis processing section 122 may, rather than performing analysis processing before a primary warning message is notified from the primary analysis device 110, start to perform analysis processing only when a primary warning message is notified by the primary analysis device 110. Further, if primary warning messages are given with details which vary in accordance with seriousnesses and urgencies of problems detected at the primary analysis device 110, the secondary analysis processing section 122 may perform analysis processing only if the seriousness/urgency of a primary warning message that has been notified is at or above a predetermined level. Thus, detailed analysis by the secondary analysis server 120 may be performed only when a problem is detected by the primary analysis device 110. Furthermore, by setting a level of seriousness/urgency of problems for which secondary processing is to be implemented, it is possible to execute the secondary processing only when necessary, and the secondary analysis server 120 can be employed efficiently.

[Determination Criteria Database 123]

The determination criteria database 123 is a memory section for memorizing determination criteria, which are used in analysis processing at the determination criteria update section 124, for determining whether or not there are problems at the maintenance object computer. The determination criteria memorized in the determination criteria database 123 enable the performance of more detailed analyses than the primary analysis processing carried out by the primary analysis device 110. The determination criteria are manually set by a maintenance/analysis operator or the like at a time of initial setting. The determination criteria database 123 is constituted such that additions, alterations and the like of the determination criteria subsequent to the initial setting can be implemented by the determination criteria update section 124. Moreover, the determination criteria database 123 may be constituted such that a maintenance/analysis operator or the like can manually alter details of settings, periodically or as appropriate.

[Determination Criteria Update Section 124]

The determination criteria update section 124 is a functional section for adding and/or altering the determination criteria stored in the determination criteria database 123. The determination criteria update section 124 suitably updates the determination criteria, parameters which are used in analysis and the like, periodically or in accordance with requests from outside. Such updates of the determination criteria are performed in accordance with additions of new applications, connected devices (for example, video cards and the like) and the like at the maintenance object computer, changes in network structure, OS upgrades, and so forth.

The determination criteria update section 124 may also continuously generate new determination criteria from new issues that come up in the process of the analysis processing at the secondary analysis processing section 122, and from methods for responding thereto and the like, and reflect these in the determination criteria database 123. Thus, Knowhow obtained in the analysis processing can be utilized in the form of determination criteria, and higher quality analyses can be performed. Furthermore, when such a determination criteria database reflecting Knowhow from analysis processing is employed, even users without specialist knowledge can perform reliable maintenance operations with ease.

The determination criteria update section 124 may also alter the determination criteria database 123 using analysis object data, the primary analysis report 140 and the like that are received from the primary analysis device 110. Thus, know-how information that comes up in the process of the analysis processing performed at the primary analysis devices 110 can be reflected in the determination criteria database 123. Hence, because of the determination criteria that are used in analysis being updated periodically and/or as appropriate, know-how corresponding to added peripheral devices, recent OS versions and the like can be accumulated, reliable analyses corresponding to conditions of maintenance object computers can be performed, and convenience is improved.

[Secondary Analysis Report Generation Section 125]

The secondary analysis report generation section 125 is a functional section for generating a secondary analysis report 150 from results of analysis at the secondary analysis processing section 122. The secondary analysis report generation section 125 receives analysis results from the secondary analysis processing section 122 and generates the secondary analysis report 150, which includes problems with settings of the maintenance object computer, methods for responding thereto and the like. The secondary analysis report 150 that has been generated is sent to the secondary analysis report transmission section 126. Further, the secondary analysis report 150 may be stored at a memorization device such as a hard disk or the like (not shown).

The secondary analysis report 150 may be generated in a format which can be displayed by a web browser, such as HTML (HyperText Markup Language), XML (eXtensible Markup Language) or the like. Hence, an analysis operator, a user or the like can check the contents of the secondary analysis report 150 using an information processing device at which a web browser is installed.

[Secondary Analysis Report Transmission Section 126]

The secondary analysis report transmission section 126 is a functional section for transmitting the secondary analysis report 150 outputted from the secondary analysis report generation section 125 to the monitoring output device 130. The secondary analysis report transmission section 126 may transmit analysis object data whenever the secondary analysis report transmission section 126 receives the secondary analysis report 150 from the secondary analysis report generation section 125. Alternatively, the secondary analysis report 150 may be stored at a memorization device such as a hard disk or the like (not shown) and the secondary analysis report transmission section 126 may transmit the secondary analysis report 150 periodically at a predetermined time interval. Alternatively, the secondary analysis report transmission section 126 may read out the secondary analysis report 150 stored in the memorization device such as a hard disk or the like (not shown) and transmit the same at a time when there is a request from the monitoring output device 130.

[Secondary Warning Message Notification Section 127]

The secondary warning message notification section 127 is a functional section for notifying the monitoring output device 130 with warning messages concerning problems detected in results of analyses by the secondary analysis processing section 122. The warning messages may give notice of all detected problems. Alternatively, levels of seriousness and urgency of detected problems may be compared, and a warning message given only when a problem is detected for which the degree of seriousness or urgency is at least a certain level. Further, warning messages which differ in accordance with levels of seriousness/urgency of problems may be given. Thus, a user can be promptly notified of the occurrence of a problem and of the seriousness and urgency of the problem, and there is a great effect in cases in which it is necessary to respond rapidly to the problems.

[Monitoring Output Device 130]

The monitoring output device 130 is a device which outputs the primary analysis report 140 and secondary analysis report 150 that are respectively transmitted from the primary analysis device 110 and secondary analysis server 120, and is used by a system administrator, a user or the like for monitoring the state of the maintenance object computer. The monitoring output device 130 may be, for example, an information processing device such as a personal computer, a portable information terminal or the like that is equipped with a display section, such as a display screen or the like, which displays the primary analysis report 140 and the secondary analysis report 150. Further, the monitoring output device 130 may be a printing device such as a printer or the like which prints the primary analysis report 140 and the secondary analysis report 150 onto a recording medium such as paper or the like.

The monitoring output device 130 may output the primary analysis report 140 and the secondary analysis report 150 in association with one another. That is, if analysis results relating to the same item are present in both the primary analysis report 140 and the secondary analysis report 150, these results can be observed simultaneously, or can be outputted such that one result can be easily referred to from another result. Thus, when details which have been analyzed at the primary analysis device are further analyzed in more detail by the secondary analysis server, detailed analysis results of problems which are detected by the primary analysis report 140 can be easily referred to from the secondary analysis report 150. Furthermore, there may be a large amount of data in the secondary analysis report 150, because the secondary analysis report 150 includes detailed analysis results. However, in such a case, details that should be referred to can be found with ease.

The monitoring output device 130 may also be provided with a memorization device constituted with some kind of recording medium such as, for example, semiconductor memory, an optical disk, a magnetic disk or the like, and may be structured so as to store the primary analysis report 140 and secondary analysis report 150 that have been transmitted thereto. Thus, previously transmitted primary analysis reports 140 and secondary analysis reports 150 can be aggregated in the memorization device, the previous reports can be observed at arbitrary times, and reports from a number of different periods can be compared.

When the monitoring output device 130 receives a primary warning message from the primary analysis device, or receives a secondary warning message from the secondary analysis server, the monitoring output device 130 may emit a warning alarm and notify a user of an anomaly at the maintenance object computer. Alternatively, the monitoring output device 130 may emit a warning alarm only when both a primary warning message and a secondary warning message are received.

The warning alarm attracts the attention of an operator and is constituted so as to enable verification of the anomaly at the computer. For example, a text or an image may be outputted at a display section such as a display screen or the like, or a printer or the like, and/or a sound may be outputted by a buzzer, a speaker or the like. Further, an e-mail message giving notice of the anomaly may be sent to an e-mail address of an analysis operator or the like. Thus, an analysis operator, a user or the like can be promptly made aware of the anomaly at the computer, and a rapid response is possible.

Warning alarms may be output in levels in accordance with degrees of anomaly. For example, when using the above-mentioned display, speaker or the like, different outputs may be implemented in accordance with degrees of anomaly, or plural LEDs may be used and a number of LEDs lit in accordance with a degree of anomaly. Thus, an operator can more intuitively verify the degree of an anomaly at the maintenance object computer.

Hereabove, the computer maintenance support system 100 relating to the present embodiment has been described.

Figure 5:
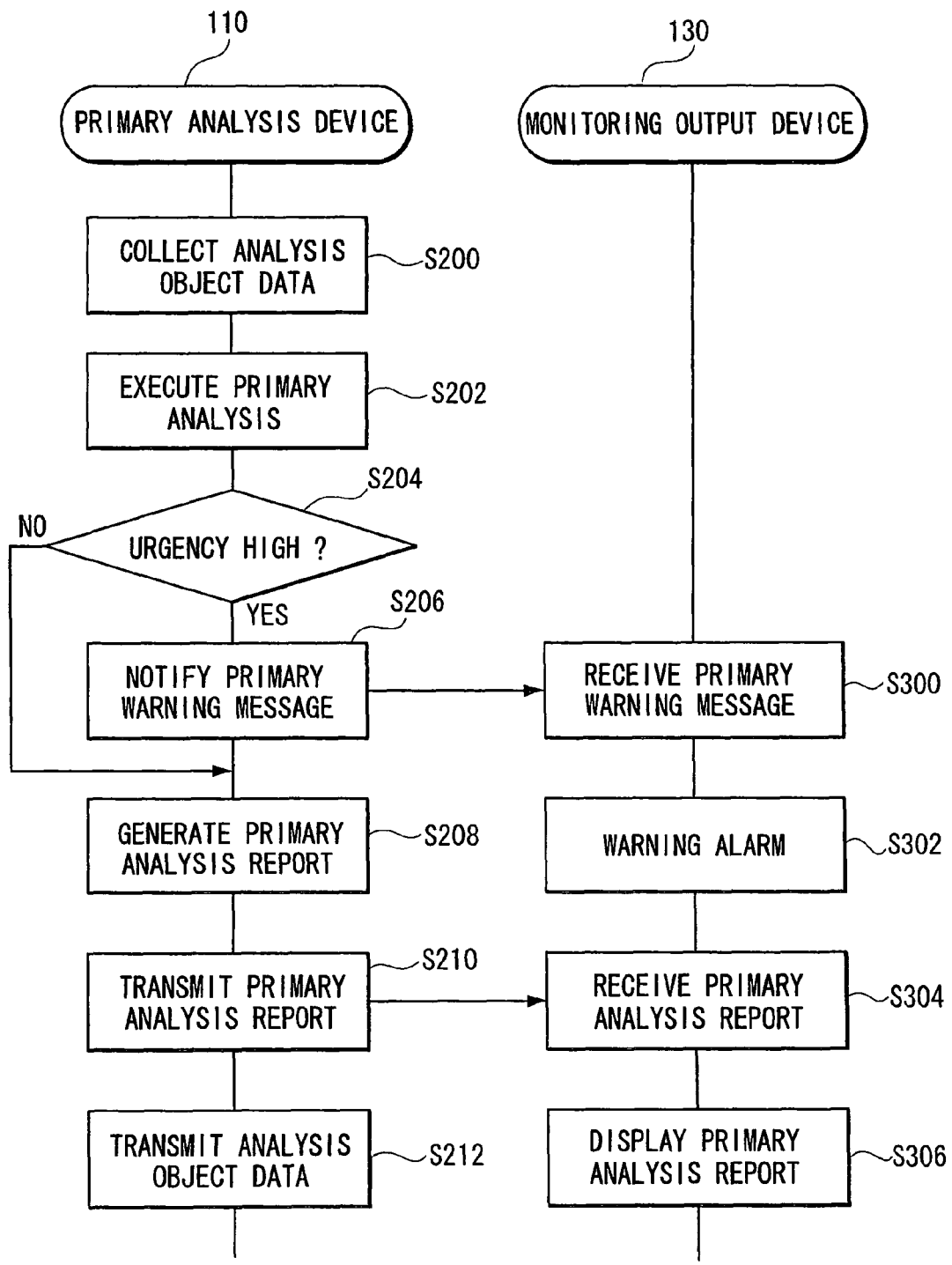
FIG. 5 is a flowchart showing a flow of processing of the primary analysis device and an output device for monitoring.

Next, an example of processing which is executed by the computer maintenance support system 100 relating to the present invention will be described on the basis of FIG. 5 and FIG. 6. FIG. 5 is a flowchart showing a flow of primary analysis processing which is carried out at the primary analysis device 110 and the monitoring output device 130. FIG. 6 is a flowchart showing a flow of secondary analysis processing which is carried out at the secondary analysis server 120 and the monitoring output device 130.

As shown in FIG. 5, firstly, in step S200, the primary analysis device 110 collects analysis object data, constituted of settings information, resource information, log information and the like which have been saved at the maintenance object computer. Processing for collection of the analysis object data may be executed periodically at a predetermined time interval, or may be executed as appropriate in accordance with control by an analysis operator, a user or the like, or the like.

Then, in step S202, the primary analysis device 110 analyzes contents of the collected analysis object data.

If a problem is detected as a result of the analysis of step S202, urgency of the problem is determined in step S204 and, in step S206, a primary warning message gives notice from the primary analysis device 110 to the secondary analysis server 120 and the monitoring output device 130.

The monitoring output device 130 receives the primary warning message in step S300 and, in step S302, generates a warning alarm.

Then, in step S208, the primary analysis device 110 generates the primary analysis report 140 on the basis of the analysis results. In step S210, the primary analysis device 110 transmits the primary analysis report 140 to the secondary analysis server 120 and the monitoring output device 130.

In step S304, the monitoring output device 130 receives the primary analysis report 140, and in step S306, the monitoring output device 130 displays the primary analysis report 140.

In step S212, the analysis object data collected in step S200 is transmitted to the secondary analysis server 120. Step S212 may be executed at any time as long as it is after step S200. For example, step S212 may be executed after step S200 and may subsequently be executed after step S202. Alternatively, step S212 may be executed simultaneously with the transmission of the first warning message or the primary analysis report 140 in step S206 or step S210. Alternatively, step S212 may start execution at a time of a request from the secondary analysis server 120.

Next, processing at the secondary analysis server 120 and the monitoring output device 130 will be described with reference to FIG. 6. Here, an example of processing in which the secondary analysis server 120 executes secondary analysis processing when a primary warning message is received from the primary analysis device 110 will be described.

First, in step S400, the secondary analysis server 120 receives the primary warning message from the primary analysis device 110.

Then, in step S402, the secondary analysis server 120 requests and acquires the analysis object data and the primary analysis report 140 from the primary analysis device 110.

Then, in step S404, secondary analysis processing is executed on the basis of the acquired analysis object data and the primary analysis report 140.

If a problem is detected as a result of the analysis of step S404, the urgency of the problem is determined in step S406 and, in step 408, a secondary warning message is notified to the monitoring output device 130.

In step S500, the monitoring output device 130 receives the secondary warning message, and in step S502, the monitoring output device 130 generates a warning alarm.

Then, in step S410, the secondary analysis server 120 generates the secondary analysis report 150 on the basis of the analysis results, and in step S412, the secondary analysis server 120 transmits the secondary analysis report 150 to the monitoring output device 130.

In step S504, the monitoring output device 130 receives the secondary analysis report 150, and in step S506, the monitoring output device 130 displays the secondary analysis report 150.

Moreover, in step S414, the secondary analysis server 120 updates the determination criteria database 123 from the results of the analysis processing of step S404.

Hereabove, a preferred embodiment of the present invention has been described with reference to the attached drawings, but the present invention is not limited to this example. It will be apparent to practitioners skilled in the art that many modifications and variations are possible within the scope recited in the claims, and obviously these will fall within the technological scope of the present invention.

What is claimed is:

1. A computer maintenance support system that provides information for supporting computer maintenance operations, the system comprising:
an analysis device that collects and analyzes analysis object data which has been saved at a computer which is an object of maintenance, the analysis object data including settings information of the computer and log information of recorded operations of the computer, the analysis device analyzing at least a resource usage condition;
an analysis server connected with the analysis device, the analysis server including a determination criteria database that is used in analysis of the analysis object data, the analysis server acquiring the analysis object data from the analysis device and analyzing the analysis object data based on the determination criteria database; and
an output device for monitoring that receives a primary analysis report of analysis by the analysis device, and a secondary analysis report of analysis by the analysis server, and outputs information to be used for the computer maintenance operations, and
at least one additional analysis device,
wherein the analysis server is connected with the analysis devices and, when analyzing the analysis object data acquired from one of the analysis devices, performs analysis by comparing the analysis object data with at least one analysis object data from another maintenance object computer with a similar system structure.

2. The computer maintenance support system of claim 1, wherein the determination criteria database stores determination criteria for determining whether or not there is a problem at the computer, the determination criteria database being updated on the basis of results of analysis processing at the analysis server.

3. The computer maintenance support system of claim 1, wherein the analysis server receives the primary analysis report from the analysis device and uses the primary analysis report in analysis of the analysis object data.

4. The computer maintenance support system of claim 3, wherein the analysis server comprises a determination criteria database, and wherein the analysis server uses at least one of the analysis object data and the primary analysis report received from the analysis device to update the determination criteria database.

5. The computer maintenance support system of claim 1, wherein the analysis device sends a primary warning message which gives notice of the urgency of a problem detected by analysis processing, to at least one of the analysis server and the output device for monitoring.

6. The computer maintenance support system of claim 5, wherein the analysis server, rather than performing analysis processing before the primary warning message is issued from the analysis device, acquires the analysis object data from the analysis device and performs analysis processing only after the primary warning message has been issued.

7. The computer maintenance support system of claim 5 wherein, when the output device for monitoring receives the primary warning message, the output device for monitoring outputs a warning alarm to give notice of an anomaly to a user.

8. The computer maintenance support system of claim 5, wherein the analysis server sends a secondary warning message, which gives notice of the urgency of a problem detected by analysis, to the output device for monitoring, and when the output device for monitoring receives the primary warning message and the secondary warning message, the output device for monitoring outputs a warning alarm.

9. The computer maintenance support system of claim 1, wherein the output device for monitoring outputs the primary analysis report and the secondary analysis report in association with one another.

10. An analysis server that provides information for supporting computer maintenance operations, the analysis server comprising:

an analysis object data reception section that receives analysis object data which has been collected by an analysis device, the analysis object data, which has been saved at a computer which is an object of maintenance, including settings information of the computer and log information of recorded operations of the computer, the analysis object reception section receiving a report on a resource usage condition that has been analyzed by the analysis device;

a determination criteria database that is used in analysis of the analysis object data;

an analysis processing section that analyzes the analysis object data based on information received from the determination criteria database; and a report generation section that generates an analysis report from results of analysis by the analysis processing section, wherein the analysis server is connected with a plurality of the analysis devices and, when the analysis processing section analyzes the analysis object data acquired from one of the plurality of analysis devices, the analysis processing section performs analysis by comparing the analysis object data with at least one analysis object data acquired from another of the analysis devices that collects analysis object data for a maintenance object computer that has a similar system structure.

11. The analysis server of claim 10, further comprising a determination criteria database that memorizes, from contents of the analysis of the analysis object data, determination criteria for determining whether or not there is a problem at the computer, the determination criteria database being updated on the basis of results of analysis processing at the analysis server.

12. The analysis server of claim 10, wherein the analysis processing section receives a primary analysis report of analysis by the analysis device, from the analysis device and uses the primary analysis report in analysis of the analysis object data.

13. The analysis server of claim 12, wherein the determination criteria database is updated using at least one of the analysis object data and the primary analysis report received from the analysis device.

14. The analysis server of claim 10, wherein the analysis server, rather than performing analysis processing before being notified with a primary warning message, which gives notice of the urgency of a problem detected by analysis processing, acquires the analysis object data from the analysis device and performs analysis processing only after the primary warning message has been issued.

15. The analysis server of claim 10, wherein the analysis server sends a secondary warning message, which gives notice of the urgency of a problem detected by the analysis processing section, to an external device.

* * * * *